United States Patent
Spracklen et al.

(10) Patent No.: US 7,013,377 B2
(45) Date of Patent: Mar. 14, 2006

(54) METHOD AND APPARATUS FOR ALLEVIATING REGISTER WINDOW SIZE CONSTRAINTS

(75) Inventors: Lawrence A. Spracklen, Boulder Creek, CA (US); Stevan Vlaovic, Mountain View, CA (US); Steven R. Hart, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 351 days.

(21) Appl. No.: 10/654,256

(22) Filed: Sep. 3, 2003

(65) Prior Publication Data

US 2005/0086453 A1   Apr. 21, 2005

(51) Int. Cl.
    *G06F 12/02*   (2006.01)
(52) U.S. Cl. ...................... 711/202; 712/228
(58) Field of Classification Search ............. 711/202, 711/217; 712/228
    See application file for complete search history.

(56) References Cited

U.S. PATENT DOCUMENTS

| | | | | | |
|---|---|---|---|---|---|
| 5,179,681 | A | * | 1/1993 | Jensen | 711/118 |
| 5,941,977 | A | * | 8/1999 | Panwar et al. | 712/23 |
| 6,934,935 | B1 | * | 8/2005 | Bennett et al. | 717/127 |
| 2004/0003211 | A1 | * | 1/2004 | Damron | 712/228 |
| 2004/0059895 | A1 | * | 3/2004 | May et al. | 712/223 |
| 2004/0133766 | A1 | * | 7/2004 | Abraham et al. | 712/217 |

* cited by examiner

*Primary Examiner*—Hiep T. Nguyen
(74) *Attorney, Agent, or Firm*—Gunnison, McKay & Hodgson, L.L.P.; Philip J. McKay (57) ABSTRACT

A method and apparatus provides the capability for a single function to safely use multiple register windows within the same function, with minimal additional support from the operating system, by specifying a new window pointer, the "Effective Current Window Pointer" (ECWP), to be used in conjunction with the prior art window pointer. According to the present invention, the new window pointer ECWP can be used to override the prior art window pointer in dictating from which register window the operands stipulated by the instructions to be executed are sourced/sinked. Consequently, using the method and apparatus of the invention, the number of spills to memory is reduced, the number of instructions required is decreased, resources are used more efficiently, and costly dependency problems and RAW (read-after-write) stalls are prevented.

23 Claims, 5 Drawing Sheets

FIG. 1

| | | |
|---|---|---|
| 201 | i7 | r[31] |
| 202 | i6 | r[30] |
| 203 | i5 | r[29] |
| 204 | i4 | r[28] |
| 205 | i3 | r[27] |
| 206 | i2 | r[26] |
| 207 | i1 | r[25] |
| 208 | i0 | r[24] |
| 209 | I7 | r[23] |
| 210 | I6 | r[22] |
| 211 | I5 | r[21] |
| 212 | I4 | r[20] |
| 213 | I3 | r[19] |
| 214 | I2 | r[18] |
| 215 | I1 | r[17] |
| 216 | I0 | r[16] |
| 217 | o7 | r[15] |
| 218 | o6 | r[14] |
| 219 | o5 | r[13] |
| 220 | o4 | r[12] |
| 221 | o3 | r[11] |
| 222 | o2 | r[10] |
| 223 | o1 | r[9] |
| 224 | o0 | r[8] |
| 225 | g7 | r[7] |
| 226 | g6 | r[6] |
| 227 | g5 | r[5] |
| 228 | g4 | r[4] |
| 229 | g3 | r[3] |
| 230 | g2 | r[2] |
| 231 | g1 | r[1] |
| 232 | g0 | r[0] |

METHOD AND APPARATUS FOR ALLEVIATING REGISTER WINDOW SIZE CONSTRAINTS

FIELD OF THE INVENTION

The present invention relates generally to microprocessors and more particularly to microprocessors utilizing register windows.

BACKGROUND OF THE INVENTION

As the performance of microprocessors and processing systems has continued to advance, more aggressive compiler optimization techniques have been employed and the corresponding number of registers required to hold all the pertinent information associated with a program state of a particular application/computation/function has dramatically increased.

Figure 1:
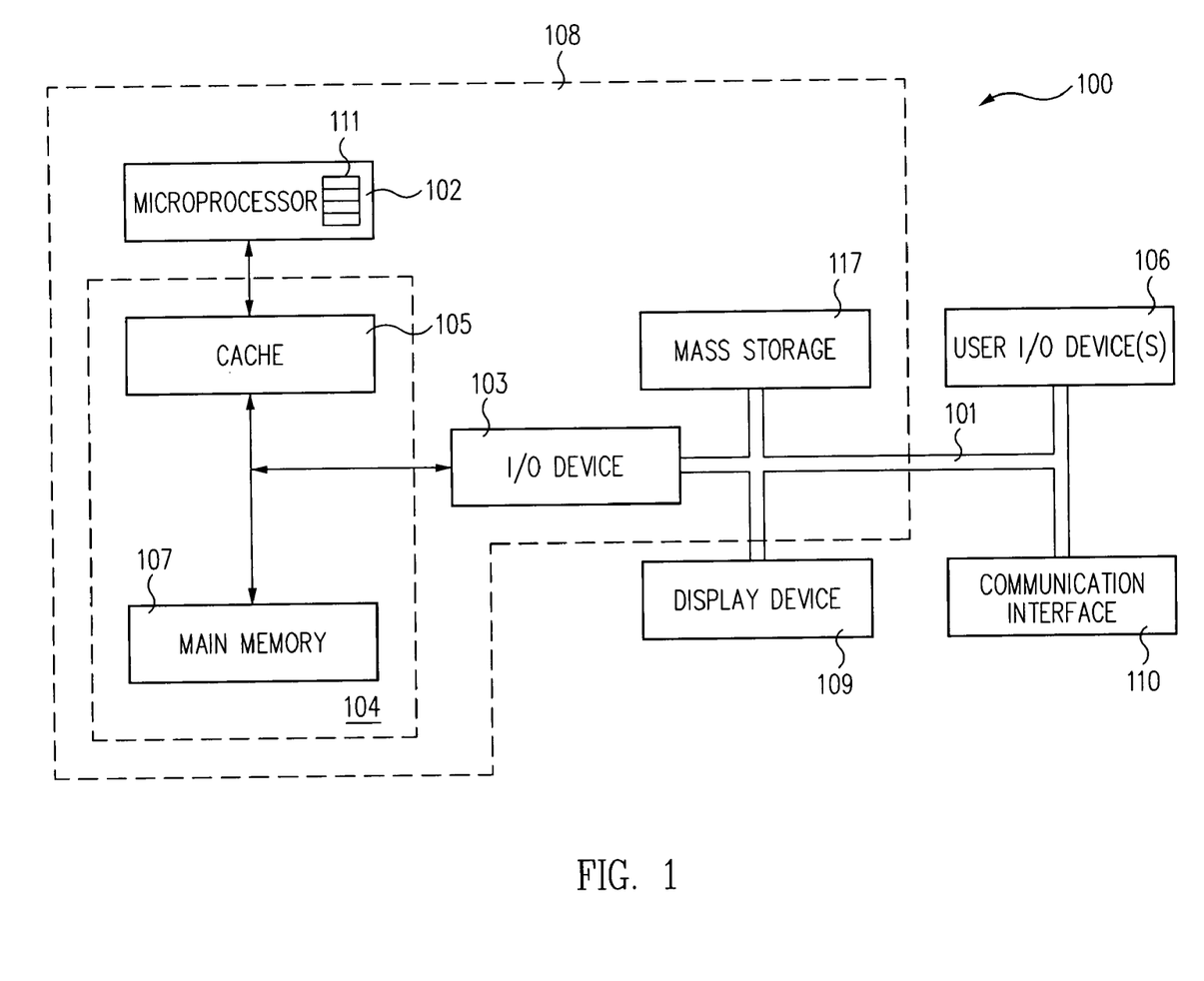
FIG. 1 shows a microprocessor computer system in accordance with the present invention.

FIG. 1 shows a microprocessor computer system in accordance with the present invention. As shown in FIG. 1, microprocessor computer system 100 can be represented as a collection of interacting functional units. These functional units perform the functions of fetching instructions and loading data from memory 107 into microprocessor registers 111, executing the instructions, placing the results of the executed instructions into microprocessor registers 111, storing the register results in memory 107, managing these memory transactions, and interfacing with external circuitry and devices. For the purposes of this discussion, a register is small, high-speed computer circuit or buffer that holds values of internal operations, such as the results of computations, and the sources and sinks of data processed by the execution stages.

Microprocessor computer system 100 further comprises an address/data bus 101 for communicating information, microprocessor 102 coupled with bus 101 through input/output (I/O) device 103 for processing data and executing instructions, and memory system 104 coupled with bus 101 for storing information and instructions for microprocessor 102. Memory system 104 comprises, for example, cache memory 105 and main memory 107.

The particular components chosen to be integrated into a single housing is based upon market and design choices. Accordingly, it is expressly understood that fewer or more devices may be incorporated within the housing suggested by dashed line 108.

Figure 2:
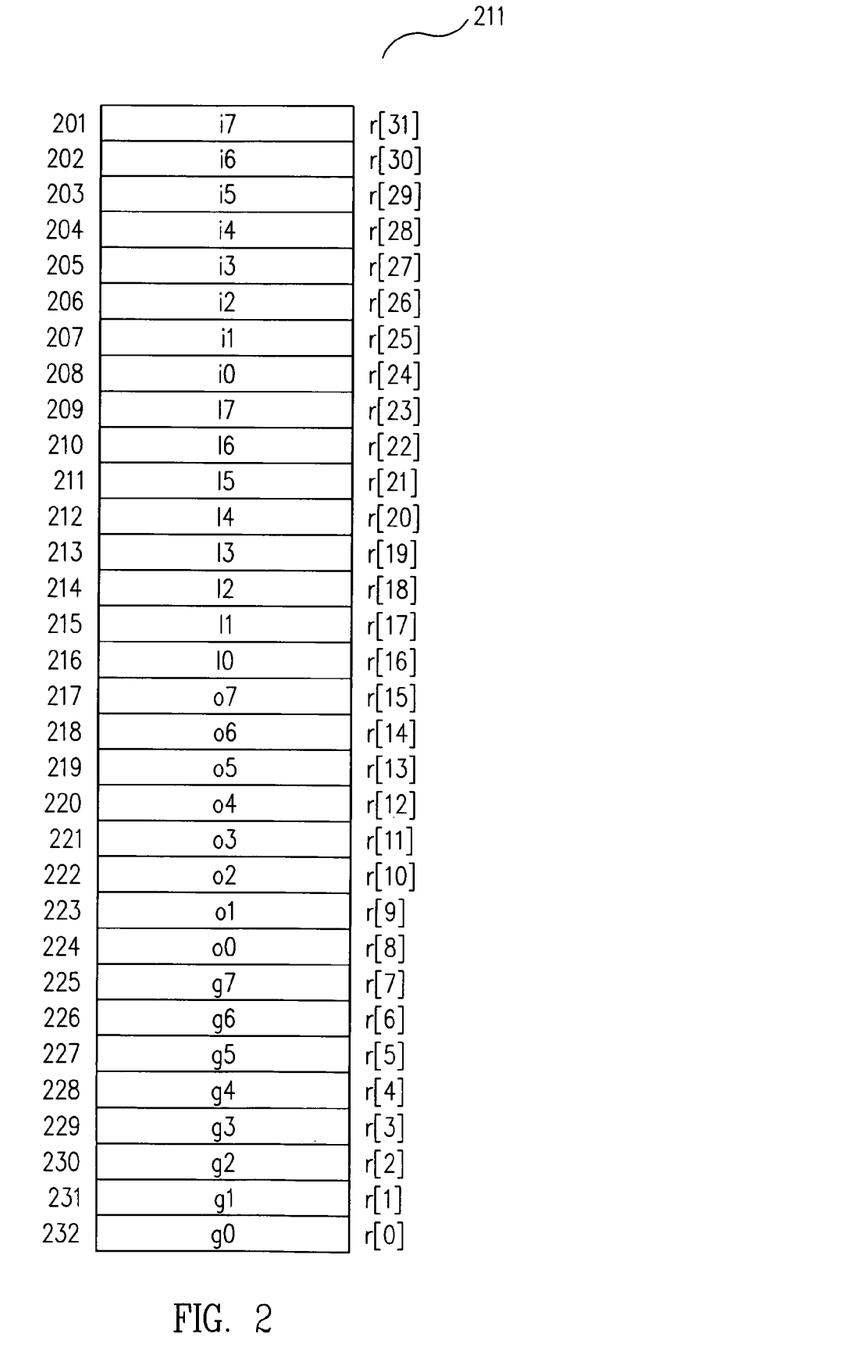
FIG. 2 shows one particular example of microprocessor registers in a register window.

FIG. 2 shows a one particular example of microprocessor registers 201 to 232 in a register window 211. FIG. 2 shows 32 registers 201 to 232 as seen in one example of one embodiment of a particular microprocessor register window 211. In FIG. 2, registers 201 to 224 are registers that are dependent on the specific register window and change from register window to register window. On the other hand, registers 25 to 32 are global registers-that are independent of the specific register window and do not change from register window to register window. Registers, such as microprocessor registers 201 to 232, and register structures, such as register window 211, and their manipulation are well known to those of skill in the art. Therefore, a more detailed discussion of registers and register structures is omitted here to avoid detracting from the invention. For a more detailed discussion of one particular embodiment of a register structure, the reader is directed to "The SPARC Architecture Manual Version 9" edited by David Weaver and Tom Germond, 1994, published by PTR Prentice Hall, ISBN 0-13-825001-4 which is incorporated herein, in its entirety, by reference and is available at website:
http://www.sparc.com/standards/SPARCV9.pdf.

Chapters 5 and 6 are particularly relevant.

Figure 3:
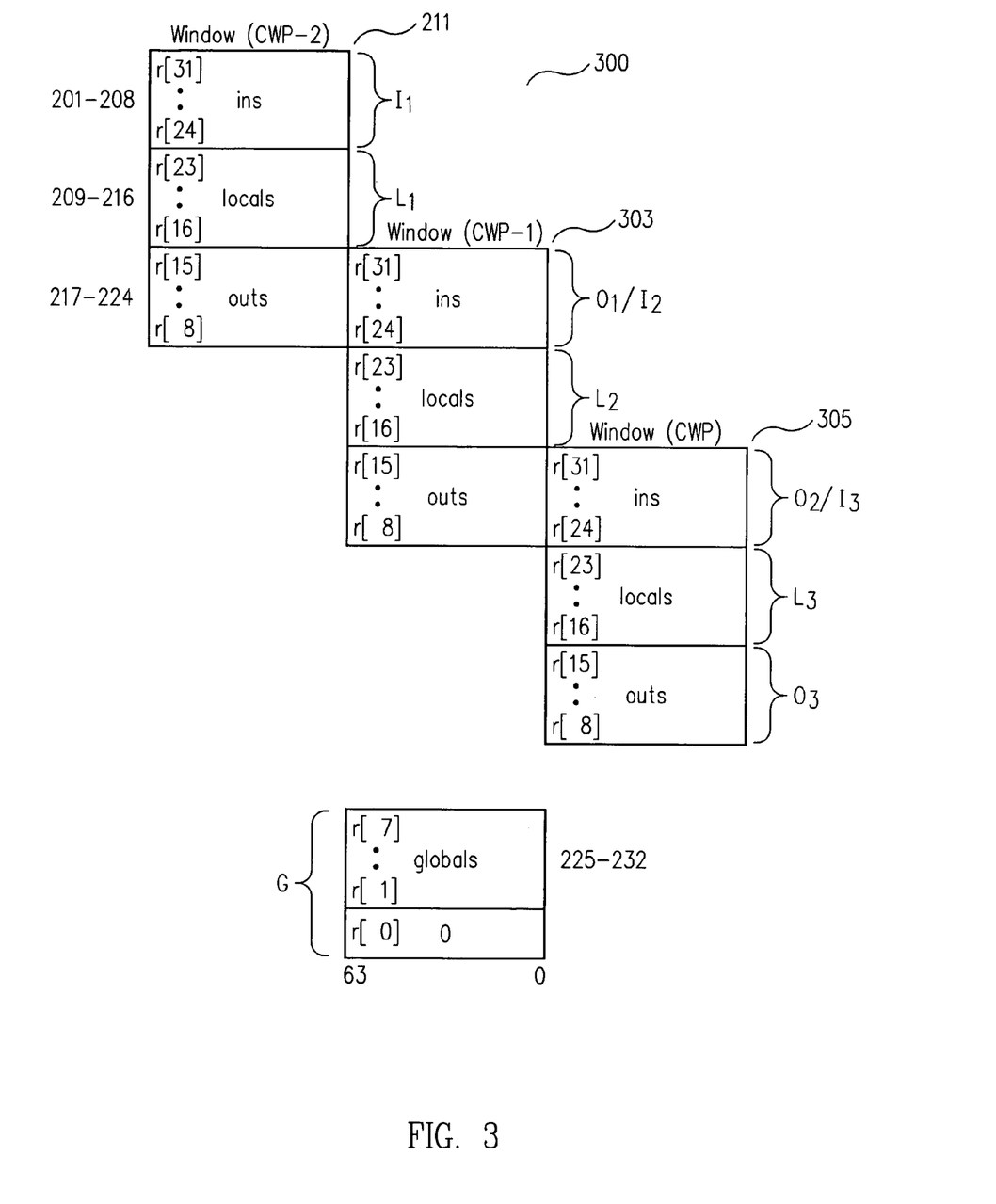
FIG. 3 shows one embodiment of microprocessor registers conceptually arranged in a register window system with overlapping registers as would typically be employed in any register window architecture.

FIG. 3 shows one embodiment of microprocessor registers, such as registers 111 from FIG. 1, conceptually arranged in a register window system 300 with overlapping register windows 211, 303 and 305 as would be employed in any register window architecture. As shown in FIG. 3, in one embodiment, each register window 211 and 303 includes: I "in" registers; L "local" registers; O "out" registers and G "global" registers. Consequently, register window 211 includes: I1 in registers; L1 local registers; O1 out registers and G global registers. Likewise, register window 303 includes: I2 in registers; L2 local registers; O2 out registers and G global registers.

Also shown in FIG. 3 is the fact that register windows 211, 303 and 305 overlap such that the "out" registers O1 of register window 211 are the "in" registers I2 of register window 303 and "out" registers O2 of register window 303 are the "in" registers I3 of register window 305. Windows 211 and 303 are overlapped to allow data to be passed between windows 211, 303 and 305, in order to facilitate parameter-passing function calls.

In this example, I1, L1, O1, O2, L2, O2, I3, L3, O3, and G each contain eight registers such that each register window 211, 303 and 305 comprises 24 registers, such as registers 201 to 224 of register window 211 of FIGS. 1 and 2. Those of skill in the art will readily recognize that while three register windows 211, 303 and 305 are shown in FIG. 3, any number of register windows can be employed depending certain constraints. In addition, while the illustrative register window 211 shown in FIG. 2 has 32 registers (twenty-four window registers and eight global registers), register windows 211, 303 and 305 could include any desired number of individual registers, arranged as desired, that is consistent with the particular "Instruction Set Architecture" (ISA) to which the present invention is being deployed. Consequently, the size and number of registers and register windows shown in the FIG.s is chosen for illustrative purposes only and should not be read to limit the spirit or scope of the invention.

As discussed above, in a register window architecture, such as register window system 300, the size of each register window 211, 303 and 305 is set at a specific number of registers, in this example registers 201 to 232. In a register window architecture, such as register window system 300, programs typically move between register windows 211, 303 and 305 on function calls and each function call receives a new set of registers. Those of skill in the art will further recognize that while it is common to change register windows, such as register windows 211, 303 and 305, based on function call boundaries, register windows can be changed arbitrarily based on the needs of the application. However, in the prior art, at any one time, a specific application can access only one register window 211, 303 or 305, and only the number of registers 201 to 232 from a single register window 211, 303, or 305. That is to say, in the prior art, a given application had access to one and only one register window 211, 303, or 305 and therefore was allotted only the number of registers, 201 to 232 for example, of one register window 211, 303, or 305 before a spill to memory, 105, 107 or 117 in FIG. 1, was required. In the specific embodiment shown in FIG. 3, and using register window 211 as an example, the number of registers 201 to 232 available to a given application includes: registers 201 to 208 shared with the previous register window (not shown); local registers 209 to 216 for temporary use in the current register window 211; registers 217 to 224 for use as outputs to the following window 303; and global registers 225 to 232.

Figure 4:
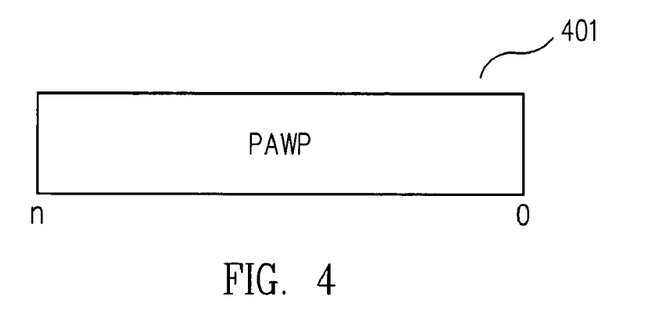
FIG. 4 shows one embodiment of a prior art window pointer (PAWP) that is a register.

As noted above, many modern microprocessors typically physically support (are available in hardware) multiple register windows 211, 303, and 305, in some cases as many as eight or more register windows 211, 303, 305, so that moving to a different register window 211, 303 and 305 on a function call for a new function/computation does not result in extra time, i.e., cycles, generating spills to memory such as memory 105, 107 or 117 in FIG. 1. In these systems, the register window 211, 303, or 305 that is visible to an application is typically determined, or marked, by a single window pointer that is often itself a register. As one specific example, the window pointer is a register designated a "Current Window Pointer" (CWP). One embodiment of a prior art window pointer 401 (PAWP 401) that is a register is shown in FIG. 4.

Window pointers, such as PAWP 401, and their use and manipulation are well known to those of skill in the art. Therefore, a more detailed discussion of window pointers is omitted here to avoid detracting from the invention. For a more detailed discussion of one particular embodiment of a window pointer, and the CWP in particular, the reader is directed to "The SPARC Architecture Manual Version 9" edited by David Weaver and Tom Germond, 1994, published by PTR Prentice Hall, ISBN 0-13-825001-4 which is incorporated herein, in its entirety, by reference and is available at website:

http://www.sparc.com/standards/SPARCV9.pdf.

Chapters 5 and 6 are particularly relevant.

Typically, PAWP 401, which indicates the current register window context, meaning the current architecturally visible register window, is incremented when entering a new function and decremented when returning from a function. In general, particular Instruction Set Architectures (ISAs) have specific instructions to manipulate PAWP 401. For instance, in the SPARC architecture ISA, a SAVE instruction is used for incrementing PAWP 401 and a RESTORE instruction is used for decrementing PAWP 401. Consequently, referring to FIG. 3, if PAWP 401, in one embodiment CWP, is set to register window 305, then the function is restricted to register window 305 and on a SAVE instruction the value of PAWP 401, in one embodiment the value of CWP, is incremented, which in this example is the next or following register window (not shown in FIG. 3). On a RESTORE instruction, the value of PAWP 401, in one embodiment the value of CWP, is decremented, in this example back to register window 305. Consequently, on a RESTORE, any data in the next register window after register window 305 (not shown) is considered invalid, is not saved on a context switch, and is unavailable to the function.

Register windows 211, 303 and 305 are typically accessed in a circular fashion such that all arithmetic operations on PAWP 401 are modulo the number of physical register windows 211, 303 and 305 supported by the microprocessor. Once all the physical register windows 211, 303 and 305 are used, PAWP 401 wraps-around and the original contents of the first register window (211 in FIG. 3) are spilled to memory (105, 107 or 117 in FIG. 1) and then filled when required. Consequently, as noted above, by specifying the number of register windows 211, 303 or 305 the actual number of physical registers is also specified.

Register windows, register window structures and manipulation of register windows, such as register window system 300, are well known to those of skill in the art. Therefore, a more detailed discussion of register windows, register window structures, and manipulation of register windows is omitted here to avoid detracting from the invention. For a more detailed discussion of one particular embodiment of a register window architecture, register window structures, and manipulation of register windows, the reader is again directed to "The SPARC Architecture Manual Version 9" edited by David Weaver and Tom Germond, 1994, published by PTR Prentice Hall, ISBN 0-13-825001-4, incorporated herein, in its entirety, by reference and available at website:

http://www.sparc.com/standards/SPARCV9.pdf.

Chapters 5 and 6 are particularly relevant.

As noted above, with the adoption of more aggressive compiler optimization techniques, coupled with increasing instruction latencies as microprocessors move to higher clock speeds, the number of registers 201 to 232 required to hold all of the pertinent information associated with a computation is increasing. Of course, in a register window architecture, such as register window system 300, this means that when all of the available registers 201 to 232 of the one register window 211, 303 or 305 associated with a given application are utilized, it is necessary to spill data to memory. This involves storing the excess information to memory, such as memory 105, 107 or 117 in FIG. 1, and then filling it whenever it is required.

The storing of excess information to memory, such as memory 105, 107 or 117 in FIG. 1, and then filling it whenever it is required, is highly undesirable and results in a large detrimental impact on performance for at least three reasons. First, the process significantly increases the number of instructions required for a given computation due to spill/fill handling. Second, the process of filling and spilling registers squanders resources. Third, storing of excess information to memory, such as memory 105, 107 or 117 in FIG. 1, and then filling it whenever it is required potentially introduces costly dependency problems and RAW (read-after-write) stalls. Consequently, in the prior art, a significant number of important applications suffered noticeably from being restricted to the number of registers 201 to 232 in a single register window 211, 303, or 305.

One seemingly simple solution to the problem discussed above would be to increase the size of the register windows 211, 303 and 305, i.e., increase the number of registers 201 to 232 allotted each register window 211, 303 and 305. However, any register based architecture with fixed size operand fields in the instruction definition cannot address more than the predetermined number of registers 201 to 232 in a register window 211, 303, or 305 at once. Consequently, significant alterations would be required to the "Instruction Set Architecture" (ISA) in order to expand the size of the register windows 211, 303 and 305. As those of skill in the art will readily recognize, this is not a viable option and therefore this seemingly simple approach is impractical.

The fact discussed above that, in the prior art, memory spills are frequently required and a significant number of important applications suffer noticeably from being restricted to the use of registers 201 to 232 in a single register window 211, 303, or 305 is particularly wasteful and frustrating since there are physical registers available in the register windows 211, 303 or 305 other than the one register window 211, 303 or 305 that the application is currently using. Unfortunately, prior art methods and structures could not enable an application to access multiple register windows 211, 303 and 305 in the same function. This was because even though a single function could theoretically move between register windows 211, 303 and 305 by manipulating PAWP 401 and by using the SAVE and RESTORE instructions, the typical RESTORE instruction specifies that any register windows 211, 303 or 305 greater than the register window 211, 303 or 305 indicated by PAWP 401 be no longer considered by the micro-processor/operating system to be valid after issuing the RESTORE instruction. Consequently, in the prior art, once a register window 301, 303 and 305 is vacated using RESTORE instruction, a function is not guaranteed that any data left in the register window 301, 303 and 305 will still be present the next time the register window 301, 303 and 305 is accessed after a SAVE. This behavior is typically observed when a RESTORE instruction is used with a return from a function and the function's processing has been completed. In the prior art, this behavior essentially prevented the use of multiple register windows 301, 303, 305 to hold data pertinent for a single function.

In short, the result in the prior art was that a function was restricted to using only the number of registers 201 to 232 in a single register window 301, 303 or 305 and any data that could not be contained in the current register window had to be spilled to memory, such as memory 107 or 117 in FIG. 1. Frustratingly, this was the case despite the fact that extra physical registers were typically readily available in other register windows 301, 303 or 305.

What is needed is a method for allowing the use of multiple register windows 301, 303, 305 to hold data pertinent to a single function.

SUMMARY OF THE INVENTION

The present invention is directed to a method and apparatus for providing a given function access to more than one register window in a register window architecture, thereby reducing the number of spills to memory, decreasing the number of instructions required, using resources more efficiently, and reducing costly dependency problems and RAW (read-after-write) stalls.

The present invention provides the capability for software to safely use multiple register windows in the same function (or register window context), with minimal additional support from the operating system, by specifying a new window pointer, the "Effective Current Window Pointer" (ECWP), to be used in conjunction with the prior art window pointer. According to the present invention, the new window pointer ECWP can be used to override the prior art window pointer in dictating from which register window the operands stipulated by the instructions to be executed are sourced/sinked. According to the present invention, as few as one new instruction, which could readily be implemented by those of skill in the art, is used to manipulate the ECWP of the invention.

According to the present invention, while the prior art window pointer might be set to one register window, for example, the fifth register window, the ECWP of the invention could be set to a different, but trailing, register window, for example, the third register window. According to the invention, once ECWP is set, instructions are able to source/sink their operands in the register window designated by the ECWP, in this example the third register window, while the prior art window pointer would remain unchanged, in this example at the fifth register window. According to one embodiment of the invention, the ECWP would generally mirror the prior art pointer function, and would only deviate when explicitly indicated by the applications by using the new instruction(s). Consequently, employment of the method and apparatus of the present invention does not impact existing applications and does not alter the register windowing system for applications that do not utilize the ECWP. Therefore, the present invention is completely backwards compatible.

In addition, the hardware modifications needed to implement the present invention are relatively simple and a variety of structures can be employed to implement the present invention based on the needs of the user. For example, in one embodiment, a special instruction is used as a multiplexor (MUX) select with inputs comprising the PAWP and ECWP.

Using the method and structure of the invention, a given function can access more than one register window. Consequently, register resources can be used more efficiently and the memory spills frequently required in the prior art are avoided. Consequently, using the present invention, the number of instructions required for a given computation is decreased, resources are used more efficiently, and costly dependency problems and RAW (read-after-write) stalls are avoided. As a result, using the present invention, a significant number of important applications can be run faster and more efficiently.

In addition, by specifying a new window pointer ECWP to be used in conjunction with the prior art window pointer, the present invention provides the capability for a single function to safely use multiple register windows with minimal additional support from the operating system and the hardware modifications needed to implement the present invention are relatively simple with a variety of structures possible based on the needs of the user.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of this specification, illustrate embodiments of the invention and, together with the description, serve to explain the advantages and principles of the invention. In the drawings.

DETAILED DESCRIPTION

The invention will now be described in reference to the accompanying drawings. The same reference numbers may be used throughout the drawings and the following description to refer to the same or like parts.

The present invention is directed to a method and apparatus for providing a given function access to more than one register window (211 in FIG. 2, 211, 303 and 305 in FIG. 3, and 601, 602, 603, 604, 605 and 606 in FIG. 6) in a register window architecture (300 in FIG. 3, 600 in FIG. 6), thereby reducing the number of spills to memory (105, 107 or 117 in FIG. 1), decreasing the number of instructions required, using resources more efficiently, and reducing costly dependency problems and RAW (read-after-write) stalls.

Figure 5:
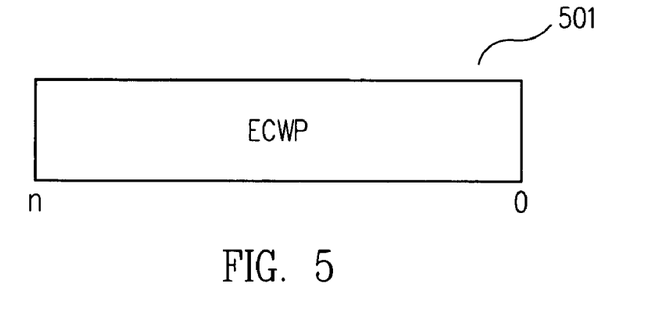
FIG. 5 shows one embodiment of an "Effective Current Window Pointer" (ECWP) of the invention that is a register.
Figure 6:
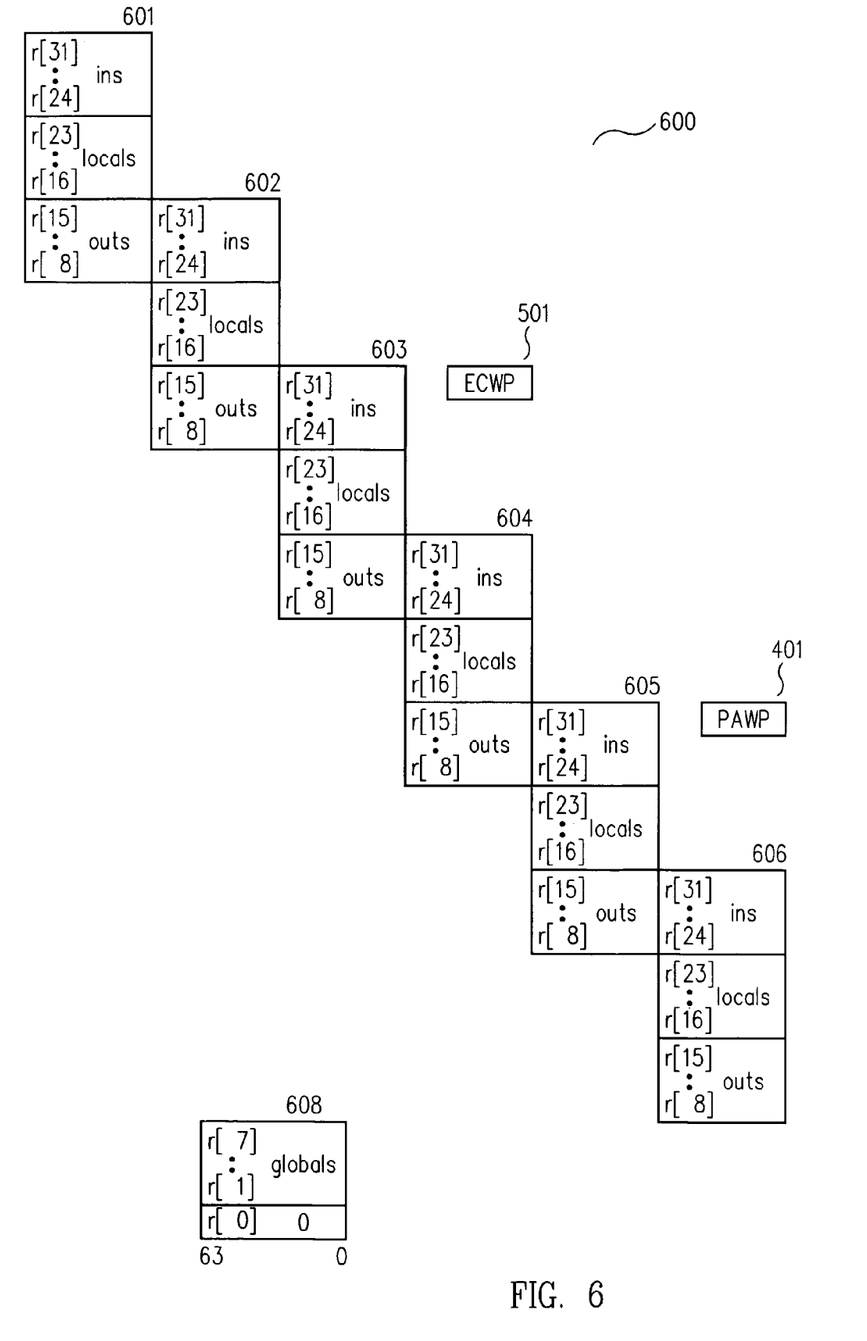
FIG. 6 shows one embodiment of microprocessor registers conceptually arranged in a register window system with overlapping registers, a prior art window pointer, and the "Effective Current Window Pointer" of the invention and in accordance with the present invention.

The present invention provides the capability for a single function to safely use multiple register windows within the same function (or register window context) with minimal additional support from the operating system by specifying a new window pointer, the "Effective Current Window Pointer" (ECWP)(501 in FIG. 5 and FIG. 6) to be used in conjunction with the prior art window pointer (PAWP) 401 in FIG. 4 and FIG. 6). According to the present invention, the new window pointer ECWP can be used to override PAWP in dictating from which register window the operands stipulated by the instructions to be executed are sourced/sinked. According to the present invention, one or two new instructions (not shown) are used to manipulate the ECWP of the invention.

According to the present invention, while the prior art window pointer PAWP (401 in FIG. 6) might be set to one register window, for example, the fifth register window (605 in FIG. 6), the ECWP of the invention (501 in FIG. 6) could be set to a different, but trailing, register window, for example, the third register window (603 in FIG. 6) using the new instructions of the invention (not shown). According to the invention, once ECWP (501 in FIG. 6) is set, instructions are able to source/sink their operands in the register window designated by the ECWP (501 in FIG. 6), in this example the third register window (603 in FIG. 6), while the prior art window pointer PAWP (401 in FIG. 6) would remain unchanged, in this example, at the fifth register window (605 in FIG. 6). According to one embodiment of the invention, the ECWP would generally mirror the prior art pointer function PAWP, and would only deviate when explicitly indicated by the applications and/or the new instructions. Consequently, employment of the method and apparatus of the present invention does not impact existing applications and does not alter the register windowing system for applications that do not utilize the ECWP. Therefore, the present invention is completely backwards compatible.

In addition, the hardware modifications needed to implement the present invention are relatively simple and a variety of structures can be employed to implement the present invention based on the needs of the user. For example, in one embodiment, a special instruction is used as a multiplexor (MUX) select with inputs comprising the PAWP and ECWP.

Using the method and structure of the invention, a given function can access more than one register window. Consequently, register resources can be used more efficiently and the memory spills frequently required in the prior art are minimized. Consequently, using the present invention, the number of instructions required is decreased, resources are used more efficiently, and costly dependency problems and RAW (read-after-write) stalls are avoided. As a result, using the present invention, a significant number of important applications can be run faster and more efficiently.

In addition, by specifying a new window pointer ECWP to be used in conjunction with the prior art window pointer, the present invention provides the capability for a single function to safely use multiple register windows within the same function with minimal additional support from the operating system and the hardware modifications needed to implement the present invention are relatively simple with a variety of structures possible based on the needs of the user.

FIG. 5 shows one embodiment of an "Effective Current Window Pointer" 501 (ECWP 501) that is a register. According to one embodiment of the invention, ECWP 501 is of the same format and size as prior art window pointer 401 (PAWP 401) shown in FIG. 4. According to the invention, ECWP 501 enables access to additional register windows. Those of skill in the art will readily recognize numerous ways to create the explicit instructions discussed above for switching the computer system into and out of the multiple register window operational mode. Consequently, a detailed discussion of these instructions is omitted here to avoid detracting from the present invention.

In one embodiment of the invention, ECWP 501 mirrors the prior art pointer function PAWP 401 (see FIG. 4 or FIG. 6), and only deviates from PAWP 401 when explicitly modified by the applications using the new instructions. Consequently, employment of the method and apparatus of the present invention and ECWP 501 does not impact existing applications and does not alter the register windowing system behavior (300 in FIGS. 3 and 600 in FIG. 6) for applications that do not utilize the ECWP 501. Therefore, the present invention is completely backwards compatible.

FIG. 6 shows one embodiment of microprocessor registers, such as registers 201 to 224 in FIG. 2, conceptually arranged in a register window system 600 with overlapping register windows 601, 602, 603, 604, 605 and 606, global registers 608, prior art window pointer PAWP 401, and the "Effective Current Window Pointer" ECWP 501 in accordance with the present invention. According to the present invention, each of register windows 601, 602, 603, 604, 605 and 606 is a register window structure similar to register window 211 of FIG. 2. Therefore, each register window 601, 602, 603, 604, 605 and 606 includes individual register 201 to 224 arranged as discussed above with respect to FIGS. 2 and 3.

Those of skill in the art will readily recognize that while six register windows 601, 602, 603, 604, 605 and 606 are shown in FIG. 6, any number of register windows can be employed depending on the hardware constraints. In addition, while the illustrative register window 211 shown in FIG. 2 has 24 registers, register windows 601, 602, 603, 604, 605 and 606 could include any desired number of individual registers, arranged as desired, that is consistent with the particular "Instruction Set Architecture" (ISA) to which the present invention is being deployed. Consequently, the size and number of registers and register windows shown in the FIGS.s is chosen for illustrative purposes only and should not be read to limit the spirit or scope of the invention.

As shown in FIG. 6 register windows 601, 602, 603, 604, 605 and 606 overlap as discussed above with respect to FIG. 3. As discussed above, in the prior art, allowing a function to use more than one register window 601, 602, 603, 604, 605 and 606 was not possible because even though a single function could theoretically move between register windows 601, 602, 603, 604, 605 and 606 by manipulating PAWP 401 by using the SAVE and RESTORE instructions, in a typical embodiment, a RESTORE instruction specifies that the vacated register window 601, 602, 603, 604, 605 or 606 be no longer considered by the processor/operating system to contain valid data after executing the RESTORE instruction. As a result, in the prior art, once a register window 601, 602, 603, 604, 605 and 606 was vacated using the RESTORE instruction, a function was not guaranteed that any data left in the vacated register window 601, 602, 603, 604, 605 and 606 would still be present the next time the register window 601, 602, 603, 604, 605 and 606 was accessed after a SAVE. Consequently, in the prior art, a function was restricted to using only the number of registers 201–224 (FIG. 2) in a single register window 601, 602, 603, 604, 605 and 606 (FIG. 6).

In contrast to the prior art, according to the present invention, a single function or register window context can safely use multiple register windows 601, 602, 603, 604, 605 and 606, with minimal additional support from the operating system (not shown). According to the present invention, this is done by introducing ECWP 501 and using ECWP 501 in conjunction with PAWP 401. According to one embodiment of the present invention, ECWP 501 is used to override PAWP 401 in dictating from which register window 601, 602, 603, 604, 605 or 606 the operands stipulated by the instruction(s) to be executed (not shown) are sourced/sinked.

According to the present invention, while the prior art window pointer PAWP 401 might be set to a specific register window 601, 602, 603, 604, 605 or 606, ECWP 501 of the invention can be set to a different register window 601, 602, 603, 604, 605 or 606 with the restriction of ECWP 501 pointing to a valid register window. Once ECWP 501 is set, instructions are capable of sourcing/sinking their operands in the register window 601, 602, 603, 604, 605 or 606 designated by ECWP 501, while PAWP 401 remains unchanged at its specific register window 601, 602, 603, 604, 605 or 606.

Those of skill in the art will readily recognize that when the method and apparatus of the invention is employed, special attention must be paid during a context switch and, in particular, during a reloading of physical register windows after a context switch. A context switch occurs when a first process is swapped out for a second process. When this occurs, the state of the registers of valid register windows 601, 602, 603, 604, 605 or 606 belonging to the first process, i.e., the first process's architectural state, is stored to memory and the second process's state is filled in from memory to the registers of register windows 601, 602, 603, 604, 605 or 606. Context switches are typically controlled by the operating system (not shown). According to the invention, at a minimum, at least the one register window 601, 602, 603, 604, 605 or 606 indicated by PAWP 401 and the register window 601, 602, 603, 604, 605 or 606 indicated by ECWP 501 must be filled. In addition, for simplicity of implementation, in one embodiment, all windows between the register window pointed to by PAWP 401 and ECWP 501, inclusive, are filled.

As also discussed above, according to one embodiment of the invention, ECWP 501 would generally mirror PAWP 401, and would only deviate when explicitly indicated by the applications by using the new instruction(s). Consequently, employment of the method and apparatus of the present invention does not impact existing applications and does not alter the register windowing system for applications that do not utilize the ECWP 501. Therefore, the present invention is completely backwards compatible.

In addition, the hardware modifications needed to implement the present invention are relatively simple and a variety of structures can be employed to implement the present invention based on the needs of the user. For example, in one embodiment, a special instruction is used as a multiplexor (MUX) select with inputs comprising the PAWP 401 and ECWP 501.

Using the method and structure of the invention, a given function can access more than one register window. Consequently, register resources can be used more efficiently and the memory spills frequently required in the prior art are avoided. Consequently, using the present invention, the number of instructions required for a given computation is decreased, resources are used more efficiently, and costly dependency problems and RAW (read-after-write) stalls are avoided. As a result, using the present invention, a significant number of important applications can be run faster and more efficiently.

In addition, by specifying a new window pointer ECWP to be used in conjunction with the prior art window pointer, the present invention provides the capability for a single function to safely use multiple register windows with minimal additional support from the operating system and the hardware modifications needed to implement the present invention are relatively simple with a variety of structures possible based on the needs of the user.

The foregoing description of an implementation of the invention has been presented for purposes of illustration and description only, and therefore is not exhaustive and does not limit the invention to the precise form disclosed. Modifications and variations are possible in light of the above teachings or may be acquired from practicing the invention.

For instance, as noted above, those of skill in the art will readily recognize that while three register windows 211, 303 and 305 are shown in FIG. 3 and six register windows 601, 602, 603, 604, 605 and 606 are shown in FIG. 6, any number of register windows can be employed depending on the hardware constraints encountered. In addition, while the illustrative register window 211 shown in FIG. 2 has 32 registers, register windows 211, 303, 305 601, 602, 603, 604, 605 and 606 could include any desired number of individual registers, arranged as desired, that is consistent with the particular "Instruction Set Architecture" (ISA) to which the present invention is being deployed. Consequently, the size and number of registers and register windows shown in the FIGS.s is chosen for illustrative purposes only and should not be read to limit the spirit or scope of the invention.

In addition, those of skill in the art will readily recognize that with minimal modification the method and apparatus of the invention can be employed with any one of numerous operating systems or any one of the numerous architectures in use in the art.

Consequently, the scope of the invention is defined by the claims and their equivalents.

What is claimed is:

1. A method for alleviating register window size constraints in microprocessor computer system using register window architecture comprising:
    providing a microprocessor having registers arranged in two or more register windows, each of said register windows comprising a plurality or registers;
    providing a first window pointer for designating one of said two or more register windows;
    providing an effective current register pointer for designating one of said two or more register windows, said effective current register pointer allowing an application running on said microprocessor to access more than one of said at least two register windows for using data associated with said application.

2. The method for alleviating register window size constraints in microprocessor computer system using register window architecture of claim 1, wherein;
    said first window pointer is a register and said effective current register pointer is a register.

3. The method for alleviating register window size constraints in microprocessor computer system using register window architecture of claim 2, wherein;
said first window pointer is a current window pointer.

4. The method for alleviating register window size constraints in microprocessor computer system using register window architecture of claim 2, wherein;
said microprocessor is a SPARC microprocessor.

5. The method for alleviating register window size constraints in microprocessor computer system using register window architecture of claim 1, wherein;
on a context switch reload of said registers of said microprocessor, said register windows designated by said first window pointer and said effective current register pointer are reloaded.

6. The method for alleviating register window size constraints in microprocessor computer system using register window architecture of claim 1, wherein;
on a context switch reload of said registers of said microprocessor, said register window designated by said first window pointer, said register window designated by said effective current register pointer, and any register windows between said register window designated by said first window pointer and said register window designated by said effective current register pointer are reloaded.

7. The method for alleviating register window size constraints in microprocessor computer system using register window architecture of claim 1, wherein;
said effective current register pointer overrides said first window pointer when said effective current register pointer designates a register window different from a register window designated by said first window pointer.

8. A method for alleviating register window size constraints in microprocessor computer system using register window architecture comprising:
providing a microprocessor having registers arranged in two or more register windows, each of said register windows comprising a plurality or registers;
providing a first window pointer for designating one of said two or more register windows, said first window pointer being a register;
providing an effective current register pointer for designating one of said two or more register windows, said effective current register pointer being a register, said effective current register pointer allowing a function running on said microprocessor to access more than one of said at least two register windows for using data associated with said application.

9. A microprocessor in microprocessor computer system using register window architecture comprising:
registers arranged in two or more register windows, each of said register windows comprising a plurality or registers;
a first window pointer for designating one of said two or more register windows;
an effective current register pointer for designating one of said two or more register windows, said effective current register pointer allowing an application running on said microprocessor to access more than one of said at least two register windows for using data associated with said application.

10. The microprocessor of claim 9, wherein;
said first window pointer is a register and said effective current register pointer is a register.

11. The microprocessor of claim 10, wherein;
said first window pointer is a current window pointer.

12. The microprocessor of claim 10, wherein;
said microprocessor is a SPARC microprocessor.

13. The microprocessor of claim 9, wherein;
on a context switch reload of said registers of said microprocessor, said register windows designated by said first window pointer and said effective current register pointer are reloaded.

14. The microprocessor of claim 9, wherein;
said effective current register pointer overrides said first window pointer when said effective current register pointer designates a register window different from a register window designated by said first window pointer.

15. A microprocessor in microprocessor computer system using register window architecture comprising:
registers arranged in two or more register windows, each of said register windows comprising a plurality or registers;
a first window pointer for designating one of said two or more register windows, said first window pointer being a register;
an effective current register pointer for designating one of said two or more register windows, said effective current register pointer being a register, said effective current register pointer allowing an application running on said microprocessor to access more than one of said at least two register windows for using data associated with said application, wherein;
on a context switch reload of said registers of said microprocessor, said register window designated by said first window pointer, said register window designated by said effective current register pointer, and any register windows between said register window designated by said first window pointer and said register window designated by said effective current register pointer are reloaded, further wherein;
said effective current register pointer overrides said first window pointer when said effective current register pointer designates a register window different from a register window designated by said first window pointer.

16. A computer system, said computer system comprising:
A microprocessor using a register window architecture said microprocessor comprising:
registers arranged in two or more register windows, each of said register windows comprising a plurality or registers;
a first window pointer for designating one of said two or more register windows;
an effective current register pointer for designating one of said two or more register windows, said effective current register pointer allowing an application running on said microprocessor to access more than one of said at least two register windows for using data associated with said application.

17. The computer system of claim 16, wherein;
said first window pointer of said microprocessor is a register and said effective current register pointer is a register.

18. The computer system of claim 17, wherein;
said first window pointer of said microprocessor is a current window pointer.

19. The computer system of claim 16, wherein;
said microprocessor is a SPARC microprocessor.

20. The computer system of claim 16, wherein;
on a context switch reload of said registers of said microprocessor, said register windows designated by said first window pointer and said effective current register pointer are reloaded.

21. The computer system of claim 16, wherein;
on a context switch reload of said registers of said microprocessor, said register window designated by said first window pointer, said register window designated by said effective current register pointer, and any register windows between said register window designated by said first window pointer and said register window designated by said effective current register pointer are reloaded.

22. The computer system of claim 16, wherein;
said effective current register pointer of said microprocessor overrides said first window pointer when said effective current register pointer designates a register window different from a register window designated by said first window pointer.

23. A computer system, said computer system comprising:
A microprocessor using a register window architecture said microprocessor comprising:
registers arranged in two or more register windows, each of said register windows comprising a plurality or registers;
a first window pointer for designating one of said two or more register windows, said first window pointer being a register;
an effective current register pointer for designating one of said two or more register windows, said effective current register pointer being a register, said effective current register pointer allowing an application running on said microprocessor to access more than one of said at least two register windows for using data associated with said application, wherein;
on a context switch reload of said registers of said microprocessor, said register window designated by said first window pointer, said register window designated by said effective current register pointer, and any register windows between said register window designated by said first window pointer and said register window designated by said effective current register pointer are reloaded, further wherein;
said effective current register pointer overrides said first window pointer when said effective current register pointer designates a register window different from a register window designated by said first window pointer.

* * * * *